United States Patent [19]

Harashima et al.

[11] Patent Number: 4,517,150
[45] Date of Patent: May 14, 1985

[54] METHOD FOR MANUFACTURING REACTIVE INJECTION-MOLDED PRODUCTS

[75] Inventors: Asao Harashima; Takashi Nakamura; Keiichi Kishimoto, all of Chiba, Japan

[73] Assignee: Toray Silicone Company, Ltd., Tokyo, Japan

[21] Appl. No.: 565,079

[22] Filed: Dec. 23, 1983

[30] Foreign Application Priority Data

Feb. 17, 1983 [JP] Japan .................................. 58-25309

[51] Int. Cl.³ .......................... B29C 1/04; B29F 1/00; B29D 27/00; C08K 5/54
[52] U.S. Cl. ..................................... 264/300; 264/53; 264/54; 264/328.6; 264/DIG. 83; 521/110; 528/48
[58] Field of Search ................. 264/300, DIG. 83, 53, 264/54, 328.6; 521/110; 528/48

[56] References Cited

U.S. PATENT DOCUMENTS 3,993,606 11/1976 von Bonin et al. ............. 264/300 X
4,024,090 5/1977 von Bonin et al. ............. 264/300 X
4,076,695 2/1978 Keil ......................... 528/48
4,220,727 9/1980 Godlewski ................... 521/110

FOREIGN PATENT DOCUMENTS 2101140 1/1983 United Kingdom ................ 264/300

Primary Examiner—Philip Anderson
Attorney, Agent, or Firm—Robert L. McKellar

[57] ABSTRACT

What is disclosed is a method of producing molded polyurethane articles by a reaction injection molding process which includes mixing one or more polyols, polyisocyanates and catalysts with an organopolysiloxane containing at least one —COOA group, wherein A is an alkali metal, and molding the curing the mixture. An example of the organopolysiloxane is

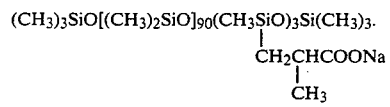

20 Claims, No Drawings

METHOD FOR MANUFACTURING REACTIVE INJECTION-MOLDED PRODUCTS

BACKGROUND OF THE INVENTION

The present invention deals with a method for manufacturing reactive injection-molded polyurethane products.

In general, a method for manufacturing reactive injection-molded polyurethane products is characterized by the following: highly chemically active liquid ingredients are mixed together in a mixing chamber under pressure, and the resulting mixture is injected into a sealed mold in which the mixture is allowed to set as a reaction takes place in the mixture.

Due to the fact that highly chemically active individual liquid ingredients are injected into a sealed mold as soon as they are mixed together, and the mixture is allowed to set as a reaction takes place in the mixture, the present method offers the following advantages: the mixture has good flow properties which in turn makes it possible to manufacture products in various shapes and with good appearance and to shorten the manufacturing time. Because of these advantages, the method has been used to manufacture, for example, furniture, shoe soles and heels, rollers, gears, bearings and other industrial parts, bumpers, fenders, fascia and other automobile parts, housings for home appliances, audio equipment, and so forth.

However, the liquid urethane used in the process is too reactive and tends to bond to the molds used. As a result, it is necessary to apply external mold-releasing agents to the molds at certain time intervals. The problem of continuously applying mold-releasing agents is one of the major obstacles that has to be overcome before the manufacturing time can be shortened significantly. In general, external mold-releasing agents are usually mixed solutions of wax or soap and low-boiling organic solvents. When applied on molds, such mold-releasing agents contaminate the manufacturing processes with the organic solvents they contain. Furthermore, molded polyurethane resin products are usually painted and thus external mold-releasing agents must be washed away before painting and thus, extra time is added to the painting process.

To eliminate such problems, the use of organosiloxanes, containing carboxyl groups, as internal mold-releasing agents has been proposed in U.S. Pat. No. 4,220,727, issued Sept. 2, 1980 and U.S. Pat. No. 4,076,695, issued Feb. 28, 1978. However, the carboxyl groups found in such agents tend to interfere with the setting of urethane resins and, in some extreme cases, the urethane resins do not even set. To eliminate this problem, it is necessary to significantly increase the amount of catalyst added to the resin. Unfortunately, polyurethane resin products manufactured using such large quantities of catalysts have physical properties that are significantly inferior to those of polyurethane products manufactured under ordinary conditions. In particular, the weatherability of such polyurethane products is markedly inferior to that of polyurethane molded products manufactured under ordinary conditions.

Furthermore, as it is widely known in the industry, that in the actual reactive injection-molding processes, it is most common to mix organoisocyanates with premixes (polyols, catalysts, chain-extending agents, etc.) under pressure and, in general, the molding machines have two supply tanks containing these starting materials. However, the carboxyfunctionalsiloxanes of the prior art have been found to be co-reactive with the ingredients in these supply tanks and therefore, the carboxyfunctionalsiloxanes cannot be stored in the organoisocyanate tank nor in the premix tank. In other words, it is necessary to install a separate tank to store the organopolysiloxanes.

The present inventors have conducted extensive research to eliminate the aforementioned defects of the conventional method for manufacturing products by reactive injection molding using conventional mold-releasing agents and achieved the present invention.

THE INVENTION

The present invention deals with a method for manufacturing reactive injection molded polyurethane resin products characterized by the following: a polyol, organoisocyanate, catalyst and an internal mold-releasing agent are mixed together, and the resulting mixture is allowed to set as the ingredients react, wherein said internal mold-releasing agent is an organopolysiloxane incorporating at least one —COOA group, per molecule, bonded to a silicon atom through a silicon-carbon bond.

The organoisocyanates used to manufacture the polyurethane resin molded products of the present invention can be for example: toluenediisocyanate (TDi), diphenylmethane diisocyanate (MDi), MDi prepolymer or MDi modified with carbodiimide. Of these compounds, MDi or MDi prepolymer is preferable. Polyols can be for example polyether polyols or polyester polyols. Preferably, for this invention, the following is used: polyether diols which are adducts of propylene glycol with propylene oxide and/or ethylene oxide; polyether triols which are adducts of glycerine with propylene oxide and/or ethylene oxide; and polyether polyols which are adducts of alcohol amines (e.g., triethanolamine) with ethylene oxide and/or propylene oxide.

Catalysts useful in this invention are amine compounds and organotin compounds. The preferred amine catalysts are: triethylamine, N-methylmorpholine, N-ethylmorpholine, N,N,N',N'-tetramethyl ethylenediamine triethylenediamine, triethanolamine, N-methyl-diethanolamine, N-ethyl-diethanolamine and N,N-dimethylethanolamine. Preferred organotin compounds are for example: dibutyltin diacetate, dibutyltin dilaurate, dibutyltin maleate and dioctyltin diacetate, Organopolysiloxanes, used as internal mold-releasing agents in this invention, are those with at least one —COOA group in the molecule, wherein A is an alkali metal. For purposes of this invention, the —COOA group is bonded to a silicon atom through a silicon to carbon bond.

Although such organopolysiloxanes only need to incorporate at least one —COOA group, it is preferable that the number of —COOA groups is 0.001–1 per silicon atom, since at numbers smaller than these the organopolysiloxanes cannot become effective internal mold-releasing agents, while at numbers greater than this the organopolysiloxanes become difficult to handle. The most preferable range is 0.01–0.5 —COOA groups per silicon atom.

The organopolysiloxanes can be linear, branched or cyclic. Linear, branched or cyclic molecules more easily disperse among the other ingredients. The degree of polymerization of the organopolysiloxanes should be 4 to 2,000, again from the viewpoint of the dispersibility of the organopolysiloxanes into other ingredients. The organic groups, to which —COOA groups are bonded, can be bonded to the molecule ends or can be pendant side chains.

Examples of organic groups useful in this invention are: divalent hydrocarbon groups such as alkylene or arylene groups, alkylene groups containing at least one ether bond, alkylene groups containing at least one thioether bond, alkylene groups containing at least one ester bond, alkylene groups containing both ether bonds and ester bonds, alkylene groups containing both thioether bonds and ester bonds and trivalent aliphatic hydrocarbon groups. From the viewpoint of stability, these organic groups should be bonded to silicon atoms through carbon atoms.

Examples of alkylene groups useful in this invention are: ethylene, propylene, isobutylene and n-octylene group. Phenylene group can be mentioned as an example of arylene groups. Groups containing at least one ether bond can be, for example —$CH_2CH_2CH_2$—$(OC_2H_4)_l$—, —$CH_2CH_2CH_2$—$(OC_3H_6)_l$— and —$CH_2CH_2CH_2$—$(OC_2H_4)_m$—$(OC_3H_6)_n$, where l, m and n are positive integers.

At least one —COOA group is bonded to these organic groups. However, those to which one or two —COOA groups are bonded are most common, for they are easy to synthesize.

The alkali metals, represented by A, can be lithium, sodium, potassium and cesium.

Example of other organic groups incorporated into these organopolysiloxanes are non-substituted monovalent hydrocarbon groups and substituted hydrocarbon groups. Examples of the former groups are the methyl, ethyl, n-hexyl, cyclohexyl and the other alkyl groups, and aryl groups, such as the phenyl group or naphtyl group. Examples of the latter groups are the 3,3,3-trifluoropropyl group, 2-phenylethyl, 2-phenylpropyl, 3-hydroxypropyl, 3-mercaptopropyl and the 3-glycidyloxypropyl group, as well as, —$CH_2CH_2C$-$H_2OOCCH_3$, —$C_3H_6$—$(OC_2H_4)_l$—$OH$ and —$C_3$-$H_6$—$(OC_2H_4)_l$—$OC_2H_5$ in which l has the same meaning as above. As for other organic groups, in general, only methyl groups or or both methyl groups and other organic groups are incorporated into organopolysiloxane groups. When both methyl groups and other organic groups are incorporated into the organopolysiloxanes, methyl groups should account for at least 80 mol %. Among other organic groups, those containing polyoxyalkylene bonds are preferable, for such groups excel in dispersion stability in pre-injection mixtures.

Preferred for this invention are organopolysiloxanes which consist essentially of from 0.5 to 20 mole percent

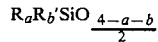

units and from 80 to 99.5 mole percent of

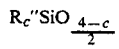

units wherein R is a —COOA group bonded to a silicon atom through a carbon to silicon bond; a has an average value of 1 to 3; R' is a hydrocarbon or substituted hydrocarbon radical; b has an average value of from 0 to 2; the sum of a+b is from 1 to 3; R" is a hydrocarbon or substituted hydrocarbon radical, and c has an average value of from 0 to 3.

The organopolysiloxanes discussed above can be manufactured easily by alkali metal blocking, in which, for example, the carboxyl groups of organopolysiloxanes incorporating carboxyl groups as functional groups are reacted with alkali metals, alkali metal hydroxides, alkali metal alcoholates or alkali metal carbonates.

The amount of organopolysiloxanes added to other ingredients is not particularly critical, However, if the quantity of organopolysiloxanes used is too small, then the mold-releasing effect tends to be insufficient. On the other hand, if used in too large a quantity, organopolysiloxanes can adversely affect the physical properties of polyurethane resin molded products. Consequently, the desirable quantity of the organopolysiloxanes used is 0.25–5.0 wt.% relative to the combined total of all the ingredients.

In addition to polyols, organoisocyanates, catalysts and internal mold-releasing agents, the following ingredients can be used: chain-extending agents, such as 1,4-butanediol, ethylene glycol, propylene glycol; foaming agents, such as water, methylene chloride, monofluorotrichloromethane, dichlorodifluoromethane, trifluoromonochloromethane, trichlorotrifluoroethane; pigments, such as carbon black, iron oxide red, titanium dioxide, zinc white; silicone-based foaming conditioners for polyurethane foam; and fillers, such as glass fibers and silica fillers.

Polyols, organoisocyanates, catalysts, internal mold-releasing agents, and other ingredients mentioned above can be used singly or in combination.

The organopolysiloxanes used as internal mold-releasing agents can be mixed with other ingredients in any stage of the manufacturing process so long as the mixing is done prior to injection. For example, the organopolysiloxanes can be mixed with polyols first, and then mixed with other ingredients. Similarly, the organopolysiloxanes can be mixed with organoisocyanates first, and then with other ingredients. They can even be mixed with a mixture of polyols, organoisocyanates and catalysts. Mixing can be performed using mixers, for example, helical mixers or by impact mixing under pressure. When the high-pressure impact mixing method is used, each solution is ejected through a nozzle at a pressure of 50–250 kg/cm², and the mixing is accomplished as the solution jets collide.

When a mixture is quickly injected into a mold of a desire shape, organoisocyanates, and polyols undergo addition reactions in the presence of catalysts, and a hardened polyurethane resin molded product is obtained as a result.

When the present method of manufacturing reactive injection-molded products is used, the polyurethane resinification reaction can proceed without any interference. Accordingly, only two starting material storage tanks are required. In addition, since polyurethane resin molded products can easily be removed from molds without requiring the application of external mold-releasing agents because of the organopolysiloxanes of this invention, the manufacturing time can be shortened significantly.

The polyurethane resin molded products thus manufactured are quite useful as furniture, shoe soles and heels, rollers, gears, bearings and other industrial parts, bumpers, fenders, and other automobile parts, housings for home appliances, audio equipment, and so forth.

In the example, "parts" refers to "parts by weight". The values of viscosity and peeling force are values obtained at 25° C.

EXAMPLE 1

To compare the mold-releasing properties of the organopolysiloxanes of the present invention with that of conventional organopolysiloxanes, organopolysiloxanes with structural formulae shown in Table I were synthesized.

TABLE I

| Classification | Specimen No. | Structural Formula |
|---|---|---|
| Present Invention | 1 | $(Me)_3SiO(SiO)_{96}(SiO)_2Si(Me)_3$ with Me and $(CH_2)_2SCH_2COONa$ side groups |
| Present Invention | 2 | Ph–Si(Me)_2O(SiO(Me)_2)_{96}(SiO(Me))_2Si(Me)_2–Ph with $(CH_2)_2SCH_2COOK$ side group |
| Present Invention | 3 | $(Me)_3SiO(SiO)_{90}(SiO)_3Si(Me)_3$ with Me and $CH_2CH(CH_3)COONa$ side groups |
| Present Invention | 4 | $NaOOC(C_3H_6)Si(Me)_2O(SiO(Me)_2)_{60}(SiO(Ph))_3Si(Me)_2(C_3H_6)COONa$ |
| Present Invention | 5 | $(Me)_3SiO(SiO)_{80}(SiO)_6(SiO)_3Si(Me)_3$ with Me, $(CH_2)_3$–O–$(CH_2CH_2O)_3CH_3$, and $(C_4H_8)COOK$ side groups |
| Present Invention | 6 | $CF_3CH_2CH_2Si(Me)_2O(SiO(Me)_2)_{70}(SiO(Me))_{35}Si(Me)_2CH_2CH_2CF_3$ with $(CH_2)_2S$–$CH_2CH(NH_2)COONa$ side group |
| Present Invention | 7 | $(Me)_3SiO(SiO)_{150}(SiO)_{18}Si(Me)_3$ with Me and $(CH_2)_3S(CH_2)_3(C_3H_6O)_3O$–$C(=O)(CH_2)_2COOLi$ side groups |
| Present Invention | 8 | $(Me)_3SiO(SiO)_{140}(SiO)_{20}Si(Me)_3$ with Me and $(CH_2)_3S(CH_2)_3O$–(anhydride/imide linkage)–$(CH_2)_2COONa$ side groups |
| Comparative Example | 9 | $(Me)_3SiO(SiO)_{96}(SiO)_2Si(Me)_3$ with Me and $(CH_2)_2SCH_2COOH$ side groups |
| Comparative Example | 10 | $(Me)_3SiO(SiO)_{90}(SiO)_3Si(Me)_3$ with Me and $(CH_2)_3$–O–$(C_3H_6O)_2C(=O)(CH_2)_2COOH$ side groups |

TABLE I-continued

| Classification | Specimen No. | Structural Formula |
|---|---|---|
| Comparative Example | 11 | $(Me)_3SiO{+}SiO{\overline{)_{90}}}{+}SiO{\overline{)_5}}Si(Me)_3$ with Me and $CH_2CHCOOH$ / $CH_2$ side groups |
| Comparative Example | 12 | $(Me)_3SiO{+}SiO{\overline{)_{100}}}Si(Me)_3$ with Me side group |

To evaluate the properties of the specimens listed in Table I, a catalyst, 2.0 parts of each organopolysiloxane listed in Table I, 107.5 parts of Coronate C-1041 (manufactured by Nihon Polyurethane K.K., an organoisocyanate with a viscosity of approximately 0.0001 m²/s (100 cst) and a 26.1% effective NCO content), 100 parts of Sanix FA909 (manufactured by Sanyo Kasei K.K., a polyether polyol with a viscosity of approximately 0.0012 m²/s (1,200 cst) and an acid value of 28.2) and 17 parts of ethylene glycol with a viscosity of approximately 0.000016 m²/s (16 cst) were mixed together simultaneously. The catalysts were 0.3 part of dipropylene glycol solution of triethylenediamine with a 33 weight percent triethylenediamine content and 0.02 part of dibutyltin dilaurate.

Each of the above mixtures was poured into a metal mold which was heated to 70° C. and in which an aluminum foil 58 μm in thickness (manufactured by Toyo Aluminum K.K., washed with chlorothene) was placed at the bottom. The mold was maintained at 70° C. for 10 minutes thereafter, after which period the molded product was removed from the mold. Then, the product, together with the aluminum foil tightly adhered to it was allowed to harden at room temperature (25° C.). For comparison, a mixture without any organopolysiloxane was poured into a metal mold. Then, the mixture was heated, released from the mold and was allowed to harden at room temperature to obtain a molded product consisting of polyurethane resin and aluminum foil (Specimen No. 14). In addition, a mixture without any organopolysiloxane was poured into a metal mold which, as before, had an aluminum foil on which A-950 (manufactured by Chukyo Yushi K.K.; a wax-based external mold-releasing agent used widely in reactive injection molding) had been applied. The mixture was heated, released from the mold and was allowed to set overnight at room temperature to obtain a molded product consisting of polyurethane resin and aluminum foil (Specimen No. 13).

The next day, a 5-kg load cell was attached to a tensile tester, and the force required to peel the aluminum foil from the polyurethane resin at a load speed of 300 mm/mn was measured. In addition, the tack-free time of each mixture was measured. The results of these measurements are listed in Table II.

The experimental results indicate that the tack-free time of the organopolysiloxanes of this invention were shorter than that of the organopolysiloxanes incorporating —COOH groups. That is, the former organopolysiloxanes had superior mold-releasing power without interfering with the setting of the urethane.

TABLE II

| Classification | Specimen No. | Peeling Force (g/cm) Minimum Value | Peeling Force (g/cm) Maximum Value | Tack-free Time (Sec.) |
|---|---|---|---|---|
| Present Invention | 1 | 100 | 130 | 31 |
| Present Invention | 2 | 110 | 150 | 30 |
| Present Invention | 3 | 120 | 150 | 26 |
| Present Invention | 4 | 150 | 250 | 30 |
| Present Invention | 5 | 170 | 230 | 28 |
| Present Invention | 6 | 190 | 260 | 26 |
| Present Invention | 7 | 170 | 230 | 33 |
| Present Invention | 8 | 120 | 180 | 33 |
| Comparative Example | 9 | 170 | 200 | 210* |
| Comparative Example | 10 | 200 | 235 | 195* |
| Comparative Example | 11 | 190 | 220 | 205* |
| Comparative Example | 12 | 800 | 1150 | 28 |
| Comparative Example | 13 | 130 | 205 | 29 |
| Comparative Example | 14 | 750 | 1100 | 28 |

*Due to severe interference with curing, mold-release was difficult immediately after manufacture.

EXAMPLE 2

A mixture, containing Specimen No. 1 of Example 1, was injected into an aluminum mold for automobile bumper manufacture using a two-solution type reactive injection molder (injection pressure 120 kg/cm², injection time 1.6 seconds).

During the reactive injection molding process, a solution containing Specimen No. 1, polyol, ethylene glycol and catalysts were metered together with an organoisocyanate. The result was that the resinification reaction of polyurethane was not hampered at all. Even though no external mold-releasing agents were applied on the mold, it was possible to repeat the process of injecting the polyurethane resin into the mold and releasing it from the mold until the entire solutions in the storage tanks, (capacity 400 l) attached to the molding machine, were gone.

EXAMPLE 3

The organopolysiloxanes used in Example 1 were substituted by those depicted by the formula below.

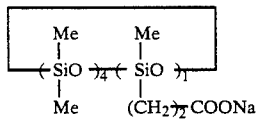

Molded products consisting of polyurethane resin and aluminum foil were manufactured using the same manufacturing conditions as those used to manufacture the products based on the present invention in Example 1. The minimum and maximum peeling force values of the molded products were 180 g/cm and 220 g/cm, respectively. The tack-free time was 29 seconds.

That which is claimed is:

1. In a process of reaction injection molding of polyurethanes which includes the mixing of one or more of each of polyols, polyisocyanates and catalysts, the reaction of the foregoing ingredients, and the molding and curing of the foregoing mixture into the desired configuration, the improvement comprising mixing with the other ingredients an organopolysiloxane which contains per molecule at least one —COOA group bonded to a silicon atom through a carbon to silicon bond, wherein A is an alkali metal.

2. A process as claimed in claim 1 wherein there is present 0.25 to 5.0 weight percent of the organopolysiloxane based on the total weight of all of the ingredients.

3. A process as claimed in claim 1 wherein in the organopolysiloxane, the —COOA group is —COONa.

4. A process as claimed in claim 1 wherein in the organopolysiloxane, the —COOA group is —COOK.

5. A process as claimed in claim 1 wherein in the organopolysiloxane, the —COOA group is —COOLi.

6. A process as claimed in claim 1 wherein in the organopolysiloxane, the —COOA group is —COOCs.

7. A process as claimed in claim 3 wherein the organopolysiloxane containing the —COONa group is

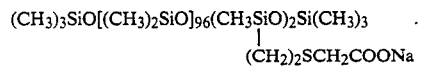

8. A process as claimed in claim 3 wherein the organopolysiloxane containing the —COONa group is

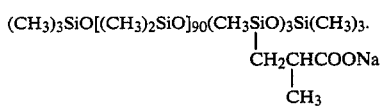

9. A process as claimed in claim 3 wherein the organopolysiloxane containing the —COONa group is NaOOC(C$_3$H$_6$)[(CH$_3$)$_2$Si][(CH$_3$)$_2$SiO]$_{60}$[C$_6$H$_5$(CH$_3$)SiO]$_3$[(CH$_3$)$_2$Si](C$_3$H$_6$)COONa.

10. A process as claimed in claim 3 wherein the organopolysiloxane containing the —COONa group is

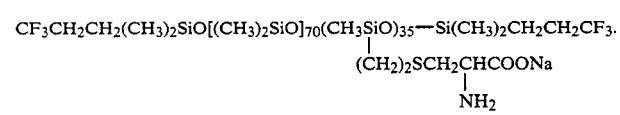

11. A process as claimed in claim 3 wherein the organopolysiloxane containing the —COONa group is

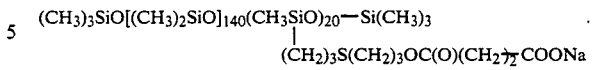

12. A process as claimed in claim 3 wherein the organopolysiloxane containing the —COONa group is

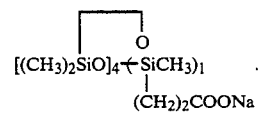

13. A process as claimed in claim 4 wherein the organopolysiloxane containing the —COOK group is

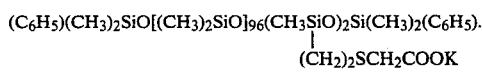

14. A process as claimed in claim 4 wherein the organopolysiloxane containing the —COOK group is

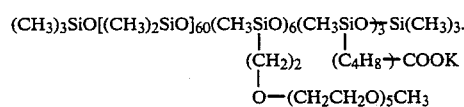

15. A process as claimed in claim 5 wherein the organopolysiloxane containing the —COOLi group is

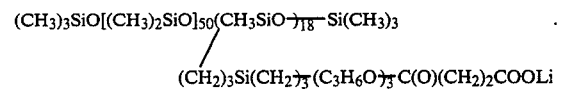

16. A process as claimed in claim 1 wherein the organopolysiloxane consists essentially of from 0.5 to 20 mole percent

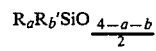

units and from 80 to 99.5 mole percent of

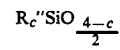

units wherein
R is a —COOA group bonded to a silicon atom through a carbon to silicon bond;
a has an average value of 1 to 3;
R' is a hydrocarbon or substituted hydrocarbon radical;
b has an average value of from 0 to 2;
the sum of a+b is from 1 to 3;
R" is a hydrocarbon or substituted hydrocarbon radical, and c has an average value of from 0 to 3.

17. A process as claimed in claim 16 wherein in the organopolysiloxane R is —R'''COOA wherein R''' is a divalent linking group composed of carbon and hydrogen atoms; carbon, hydrogen and oxygen atoms; or carbon, hydrogen and sulfur atoms.

18. A process as claimed in claim 17 wherein in the organopolysiloxane, R''' is a divalent linking group composed of carbon and hydrogen atoms and contains from 2 to 10 carbon atoms, at least 80 percent of the R' radicals are methyl radicals and at least 80 percent of the R'' radicals are methyl radicals.

19. A process as claimed in claim 17 wherein the organopolysiloxane, R''' is a divalent linking group composed of carbon, hydrogen and oxygen atoms and contains from 2 to 10 carbon atoms, at least 80 percent of the R' radicals are methyl radicals and at least 80 percent of the R'' radicals are methyl radicals.

20. A process as claimed in claim 17 wherein in the organopolysiloxane, R''' is a divalent linking group composed of carbon, hydrogen and sulfur atoms and contains from 2 to 10 carbon atoms, at least 80 percent of the R' radicals are methyl radicals and at least 80 percent of the R'' radicals are methyl radicals.

* * * * *

UNITED STATES PATENT AND TRADEMARK OFFICE
CERTIFICATE OF CORRECTION

PATENT NO. : 4,517,150

DATED : May 14, 1985

INVENTOR(S) : Asao Harashima; Takashi Nakamura; Keiichi Kishimoto

It is certified that error appears in the above-identified patent and that said Letters Patent is hereby corrected as shown below:

In the ABSTRACT, second to last sentence "curing the mixture" should read --curing mixture--.

In column 3, line 23, the symbol "$_l$" (both occurrences) should read --$\ell$--.

In column 3, line 24, the symbol "$_l$" should read --$\ell$--.

In column 3, line 42, the symbol "$_l$" should read --$\ell$--.

In column 3, line 43, the symbol "$_l$" (both occurrences) should read --$\ell$--.

In column 3, line 45, the duplicate word "or" should be deleted, should read --groups or both--.

In column 4, line 50, the word "desire" should read --desired--.

In column 7, Table I continued, in the formula, specimen No. 11,

"$CH_2\underset{|}{C}HCOOH$" should read --$CH_2\underset{|}{C}HCOOH$--
$\ \ \ \ CH_2$ $\ \ \ \ \ \ \ \ \ \ \ \ \ \ \ \ \ \ \ \ \ \ \ \ \ \ CH_3$

UNITED STATES PATENT AND TRADEMARK OFFICE
CERTIFICATE OF CORRECTION

PATENT NO. : 4,517,150
DATED      : May 14, 1985
INVENTOR(S) : Asao Harashima; Takashi Nakamura; Keiichi Kishimoto It is certified that error appears in the above-identified patent and that said Letters Patent is hereby corrected as shown below:

In column 7, line 36, the word "chlorothene" should read --chloroethene--.

In column 8, line 63, the symbol "$l$" should read --$\ell$--.

In column 9, line 1, in the formula "$(SiO)_4$ $(SiO)_1$" should read $(SiO)_1$ $(SiO)$.

Signed and Sealed this

Fifteenth Day of October 1985

[SEAL]

Attest:

Attesting Officer

DONALD J. QUIGG

Commissioner of Patents and Trademarks—Designate